(12) United States Patent
Merkel

(10) Patent No.: US 12,159,291 B2
(45) Date of Patent: Dec. 3, 2024

(54) SYSTEMS, METHODS, AND APPARATUSES FOR DETERMINING UI-SPECIFIC TRAFFIC IN A NETWORK ENVIRONMENT

(71) Applicant: BANK OF AMERICA CORPORATION, Charlotte, NC (US)

(72) Inventor: Brady Prentice Merkel, Jacksonville Beach, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 301 days.

(21) Appl. No.: 17/956,346

(22) Filed: Sep. 29, 2022

(65) Prior Publication Data

US 2024/0112206 A1 Apr. 4, 2024

(51) Int. Cl.
G06Q 30/02 (2023.01)
G06F 3/048 (2013.01)
G06Q 30/0201 (2023.01)

(52) U.S. Cl.
CPC ......... G06Q 30/0201 (2013.01); G06F 3/048 (2013.01)

(58) Field of Classification Search
None
See application file for complete search history.

(56) References Cited

U.S. PATENT DOCUMENTS

| | | | |
|---|---|---|---|
| 8,301,574 B2 | 10/2012 | Kilger et al. | |
| 9,600,828 B2 | 3/2017 | Sri et al. | |
| 10,614,806 B1 | 4/2020 | Indyk et al. | |
| 10,747,400 B1* | 8/2020 | Majumder | G06F 16/248 |
| 10,872,160 B2 | 12/2020 | Athulurutirumala | |
| 11,379,883 B2 | 7/2022 | Khoury et al. | |
| 11,715,473 B2 | 8/2023 | Rodriguez et al. | |
| 11,790,401 B2 | 10/2023 | Pittman | |
| 2009/0064008 A1 | 3/2009 | Liu et al. | |
| 2009/0234878 A1 | 9/2009 | Herz et al. | |
| 2013/0325530 A1 | 12/2013 | Pal et al. | |
| 2014/0006129 A1 | 1/2014 | Heath | |
| 2014/0380179 A1* | 12/2014 | Bose | G06Q 10/10 715/738 |
| 2015/0262217 A1* | 9/2015 | Hoyne | G06Q 30/0242 705/14.41 |
| 2017/0262164 A1* | 9/2017 | Jain | G06F 3/04847 |
| 2019/0370892 A1 | 12/2019 | Rampell et al. | |
| 2020/0034887 A1 | 1/2020 | Hamedi et al. | |
| 2020/0402144 A1 | 12/2020 | Cook et al. | |
| 2021/0350410 A1 | 11/2021 | Kang et al. | |
| 2024/0143345 A1* | 5/2024 | Fields | G06N 20/00 |

* cited by examiner

Primary Examiner — Tuan S Nguyen
(74) Attorney, Agent, or Firm — Moore & Van Allen PLLC; James C. Edwards

(57) ABSTRACT

User interactions are tracked within a Graphical User Interface (GUI) configured for user consent/authorization, specifically user interactions that indicate that the user has abandoned the consent/authorization process. As a result of such tracking/recordation, abandonment metrics are determined, such as volume of abandonments over a given time period, rate of abandonment, time to abandonment and the like. In specific embodiments of the invention, the abandonment metrics are used to intelligently determine, in some instances on a per-user basis, whether a need exists to reconfigure the GUI and, if a need exists, what sensory alterations to the GUI should be implemented.

14 Claims, 6 Drawing Sheets

SYSTEMS, METHODS, AND APPARATUSES FOR DETERMINING UI-SPECIFIC TRAFFIC IN A NETWORK ENVIRONMENT

FIELD OF THE INVENTION

The present invention is related to Graphical User Interfaces (GUIs) and, more specifically, determining GUI-specific traffic in computer network and specifically traffic associated with a user abandoning completion of service authorization or service consent within a GUI.

BACKGROUND

In many instances a user may navigate to GUI that is configured for service consent or service authorization only to have the user abandon the service consent or service authorization process. Research has shown that many factors come into play when a user has reservation about proceeding with such service consent/authorization. One of these factors is the manner in which the service consent/service authorization is presented to the user via the GUI. In this regard, how the service consent/authorization is visually or in some instances audibly presented to the user within the GUI may be a factor in whether or not the user chooses to proceed with the service consent/authorization. In some instances, the manner in which the service consent/authorization is presented to the user is confusing while in other instances the service consent/authorization presentation may be aesthetically unpleasing to the user such that an undecided user is persuaded to abandon the service consent/authorization process.

Therefore, a need exists to develop systems, computer-implemented methods, computer program products and the like that monitor and track a user's interaction with a GUI that is configured to receive user consent/authorization. Specifically, a need exists to monitor and track instances in which a user abandons the user consent/authorization (i.e., closes or exits the GUI absent providing the requisite user input for consent/authorization). Moreover, a need exists to rely on use data related to user abandonment as a means for determining whether to alter the GUI and, if so, what GUI attributes should be altered so that incidents of user abandonment decrease.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for systems, computer-implemented methods and computer program products that track and record user interactions within a Graphical User Interface (GUI) configured for user consent/authorization, specifically user interactions that indicate that the user has abandoned the consent/authorization process (i.e., exited or closed the GUI without providing the user input needed for consent/authorization). As a result of such tracking/recordation, the present invention is able to determine abandonment metrics, such as volume of abandonments over a given time period, rate of abandonment, time to abandonment and the like.

In specific embodiments of the invention, the abandonment metrics are used to determine whether a need exists to reconfigure the GUI and, if a need exists, what sensory alterations to the GUI should occur. The sensory alterations may include, but are not limited to, font type, size and/or color, background type and/or color, overall GUI format, location of user entry fields, type of user entry field, type or location of branding objects, type of visual or audible prompts and the like. The determination of need and the specific sensory alterations may be made specific to users or groups of users or may be generic in nature (i.e., applicable to all users). In specific embodiments of the invention, the identified sensory alterations/changes are applied to a segment of the users, such as those users that have previously abandoned the user consent/authorization process, while in other embodiments of the invention the identified sensory alterations/changes are deployed to all users. Once the sensory alterations to the GUI have been implemented, further tracking/recordation of user interactions are taken and further abandonment metrics are determined to assess whether the sensory alterations should be fully deployed to all users or whether further GUI reconfiguration is needed.

A system for determining Graphical User Interface (GUI)-related user behavior in a network environment defines first embodiments of the invention. The system includes a first computing platform having a first memory and one or more first computing processor devices in communication with the first memory. The first memory stores a network-hosted application that is executable by at least one of the one or more first computing processing devices. The application is configured to present a GUI that is configured to receive a user input that provides consent for a service or enrollment in a service. The system additionally includes a second computing platform having a second memory and one or more second computing processor devices in communication with the second memory. The second memory stores a GUI monitoring module that is executable by at least one of the one or more second computing processing devices. The GUI monitoring module is configured to monitor and record user interactions within the GUI, and determine, based on the monitored and recorded user interactions, user abandonment metrics that are related to instances of a user exiting the GUI without providing the user input.

In specific embodiments the system further includes a third computing platform having a third memory and one or more third computing processor devices in communication with the third memory. The third memory stores a GUI reconfiguration module that is executable by at least one of the one or more third computing processing devices. The GUI reconfiguration module is configured to receive and analyze the abandonment metrics to determine a need for at least one sensory alteration to the GUI, and, in response to determining the need for at least one sensory alteration to the GUI, identify and implement at least one sensory alteration within the GUI (i.e., reconfigure the GUI). In related embodiments of the system, the GUI monitoring module is further configured to, in response to implementing the at least one sensory alteration, monitor and record further user interactions within the GUI, and determine, based on the monitored and recorded further user interactions, further user abandonment metrics that are related to instances of a user exiting the GUI without providing the user input. In addition, in such related embodiments, the GUI reconfiguration module is further configured to receive and analyze the further abandonment metrics and compare the abandonment metrics to the further abandonment metrices to determine a need for at least one further sensory alteration to the GUI. In response to determining the need, the GUI reconfiguration module is further configured to identify and implement the at least one further sensory alteration within the GUI.

In still further related embodiments of the system, the GUI reconfiguration module is further configured to implement the at least one sensory alteration within the GUI by revising a version of the application and providing the revised version application to only those users that previously exited the GUI without providing the user input. In such related embodiments of the system, the GUI monitoring module is further configured to, in response to implementing the at least one sensory alteration, monitor and record further user interactions within the GUI of the revised application, and determine, based on the monitored and recorded further user interactions, further user abandonment metrics that are related to instances of a user exiting the GUI of the revised application without providing the user input. In such related embodiments of the system, the GUI reconfiguration module is further configured to receive and analyze the further abandonment metrics and compare the abandonment metrics to the further abandonment metrices to determine a need for full user deployment of the at least one sensory alteration, and, in response to determining the need for full user deployment of the at least one further sensory alteration, provide the revised version of the application to all users.

In specific embodiments of the system, the at least one sensory alteration within the GUI includes one or more of altering (i) a font type or size, (ii) background color or pattern, (iii) a format of the GUI, (iv) a location of a user entry field, (v) one or more branding objects presented in the GUI, and (vi) audible prompts provided by the GUI.

In other specific embodiments of the system, the abandonment metrics include at least one of (i) volume of abandonments, (ii) rate of abandonment, and (iii) average time to abandonment.

A computer-implemented method for determining Graphical User Interface (GUI)-related user behavior defines second embodiments of the invention. The computer-implemented method is executed by one or more computing processor devices. The method includes presenting a GUI that is configured to receive a user input that provides consent for a service or enrollment in a service. Additionally, the method includes monitoring and recording user interactions within the GUI, and determining, based on the monitored and recorded user interactions, user abandonment metrics that are related to instances of a user exiting the GUI without providing the user input.

In specific embodiments the computer-implemented method further includes receiving and analyzing the abandonment metrics to determine a need for at least one sensory alteration to the GUI, and, in response to determining the need for at least one sensory alteration to the GUI, identifying and implementing the at least one sensory alteration within the GUI. In related embodiments the computer-implemented method further includes, in response to implementing the at least one sensory alteration, monitoring and recording further user interactions within the GUI and determining, based on the monitored and recorded further user interactions, further user abandonment metrics. In addition, the computer-implemented method includes receiving and analyzing the further abandonment metrics and comparing the abandonment metrics to the further abandonment metrices to determine a need for at least one further sensory alteration to the GUI, and, in response to determining the need for at least one further sensory alteration to the GUI, identifying and implementing the at least one further sensory alteration within the GUI.

In other related embodiments of the computer-implemented method, implementing the at least one sensory alteration within the GUI further comprising revising a version of the application to include the at least one sensory alteration and providing the revised version of the application to only those users which previously exiting the GUI without providing the user input. In related embodiments the computer-implemented method includes in response to implementing the at least one sensory alteration, monitoring and recording further user interactions within the GUI of the revised application and determining, based on the monitored and recorded further user interactions, further user abandonment metrics that are related to instances of a user exiting the GUI of the revised application without providing the user input. In addition, the computer-implemented method includes receiving and analyzing the further abandonment metrics and comparing the abandonment metrics to the further abandonment metrices to determine a need for full user deployment of the at least one sensory alteration, and, in response to determining the need for full user deployment of the at least one further sensory alteration, providing the revised version of the application to all users.

In other specific embodiments of the computer-implemented method, the at least one sensory alteration within the GUI includes one or more of altering (i) a font type or size, (ii) background color or pattern, (iii) a format of the GUI, (iv) a location of a user entry field, (v) one or more branding objects presented in the GUI, and (vi) audible prompts provided by the GUI.

A computer program product including a non-transitory computer-readable medium defines third embodiments of the invention. The computer-readable medium includes a first set of codes for causing a computer to present a GUI configured to receive a user input that provides consent for a service or enrollment in a service. In addition, the computer-readable medium includes a second set of codes for causing a computer to monitor and record user interactions within the GUI. Further, the computer-readable medium includes a third set of codes for causing a computer to determine, based on the monitored and recorded user interactions, user abandonment metrics that are related to instances of a user exiting the GUI without providing the user input.

In specific embodiments of the computer program product, the computer-readable medium additionally includes a fourth set of codes for causing a computer to receive and analyze the abandonment metrics to determine a need for at least one sensory alteration to the GUI, and a fifth set of codes for causing a computer to, in response to determining the need for at least one sensory alteration to the GUI, identifying and implementing the at least one sensory alteration within the GUI. In related embodiments of the computer program product, the second set of codes are further configured to cause the computer to, in response to implementing the at least one sensory alteration, monitor and record further user interactions within the GUI. In such embodiments of the computer program product the third set of codes are further configured to cause the computer to determine, based on the monitored and recorded further user interactions, further user abandonment metrics that are related to instances of a user exiting the GUI without providing the user input. Moreover, in such embodiments of the computer program product the fourth set of codes are further configured to cause the computer to receive and analyze the further abandonment metrics and compare the abandonment metrics to the further abandonment metrices to determine a need for at least one further sensory alteration to the GUI, and the fifth set of codes are further configured to cause the computer to, in response to determining the need for at least one further sensory alteration to the GUI, identify and implement the at least one further sensory alteration within the GUI.

In further related embodiments of the computer program product, the fifth set of codes are further configured to cause the computer to implement the at least one sensory alteration within the GUI by revising a version of the application to include the at least one sensory alteration and providing the revised version of the application to only those users which previously exiting the GUI without providing the user input. In related embodiments of the computer program product, the second set of codes are further configured to cause the computer to, in response to implementing the at least one sensory alteration, monitor and record further user interactions within the GUI of the revised application and the third set of codes are further configured to cause the computer to determine, based on the monitored and recorded further user interactions, further user abandonment metrics that are related to instances of a user exiting the GUI of the revised application without providing the user input. Further, the fourth set of codes are further configured to cause the computer to receive and analyze the further abandonment metrics and compare the abandonment metrics to the further abandonment metrices to determine a need for full user deployment of the at least one sensory alteration, and the fifth set of codes are further configured to cause the computer to, in response to determining the need for full user deployment of the at least one further sensory alteration, provide the revised version of the application to all users.

In specific embodiments of the computer program product, the at least one sensory alteration within the GUI includes one or more of altering (i) a font type or size, (ii) background color or pattern, (iii) a format of the GUI, (iv) a location of a user entry field, (v) one or more branding objects presented in the GUI, and (vi) audible prompts provided by the GUI.

Thus, according to embodiments of the invention, which will be discussed in greater detail below, the present invention provides for tracking and recording user interactions within a Graphical User Interface (GUI) configured for user consent/authorization, specifically user interactions that indicate that the user has abandoned the consent/authorization process (i.e., exited or closed the GUI without providing the user input needed for consent/authorization). As a result of such tracking/recordation, the present invention is able to determine abandonment metrics, such as volume of abandonments over a given time period, rate of abandonment, time to abandonment and the like. In specific embodiments of the invention, the abandonment metrics are used to intelligently determine, in some instances on a per-user basis, whether a need exists to reconfigure the GUI and, if a need exists, what sensory alterations to the GUI should be implemented.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
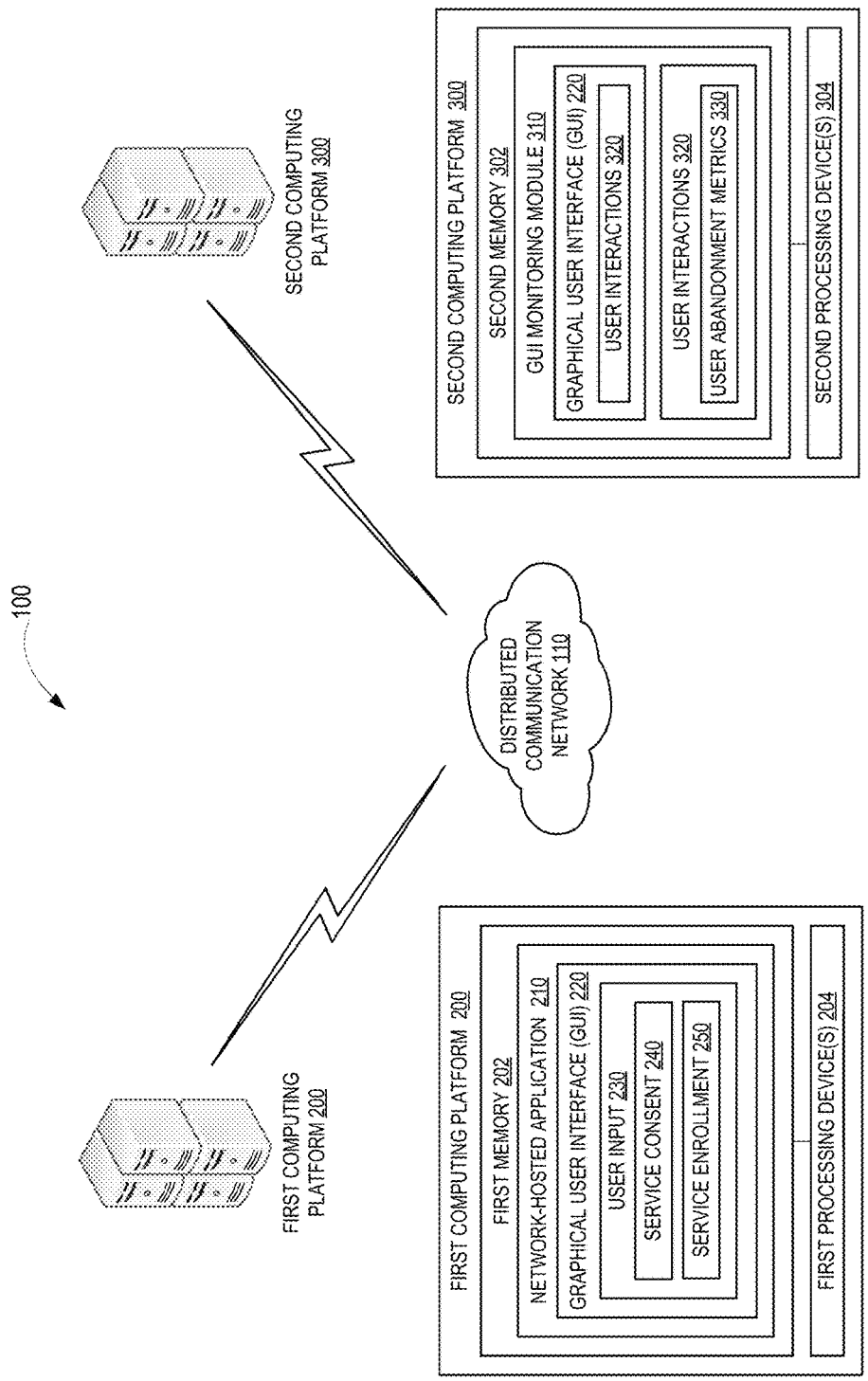
Figure 2:
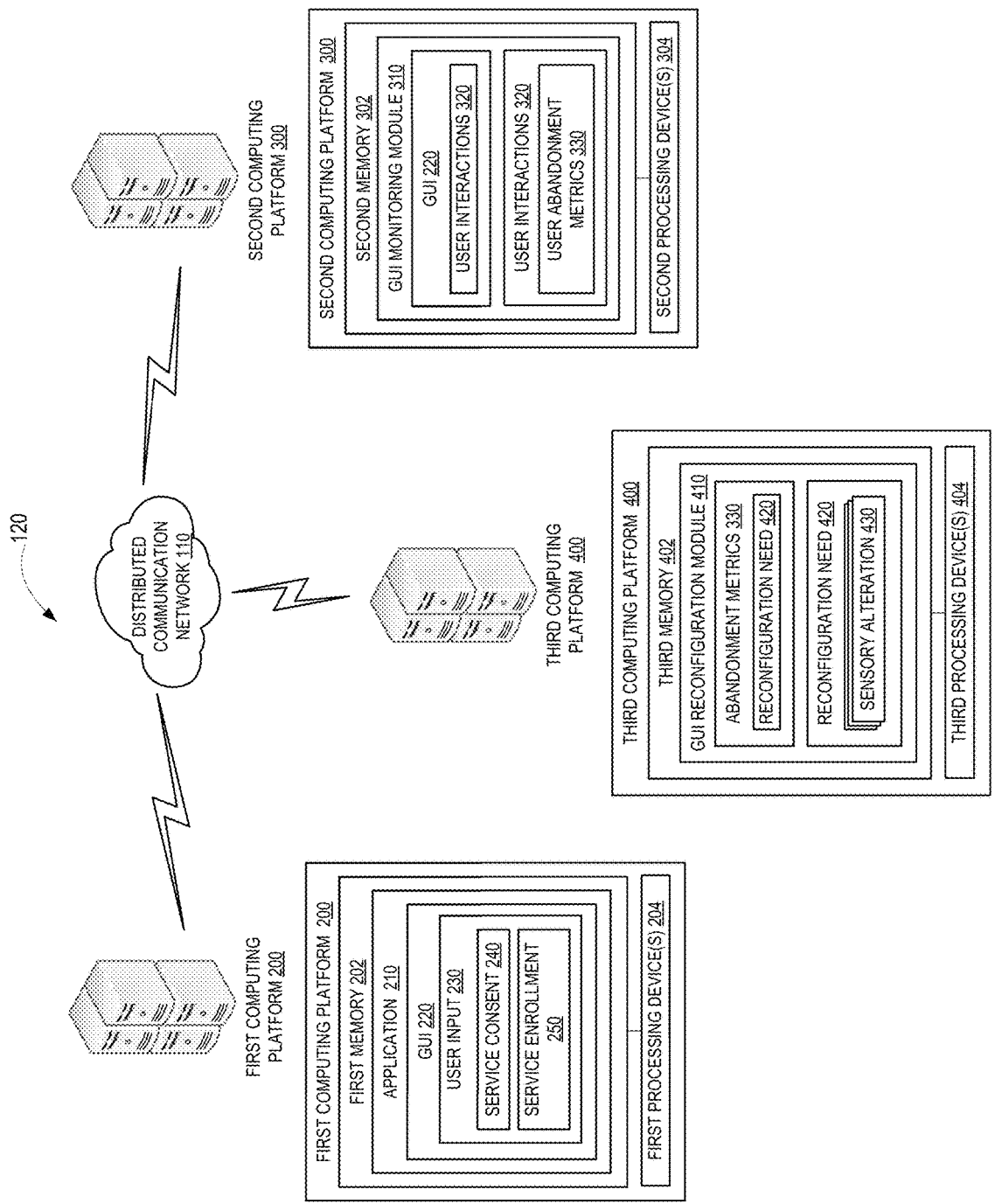
Figure 3:
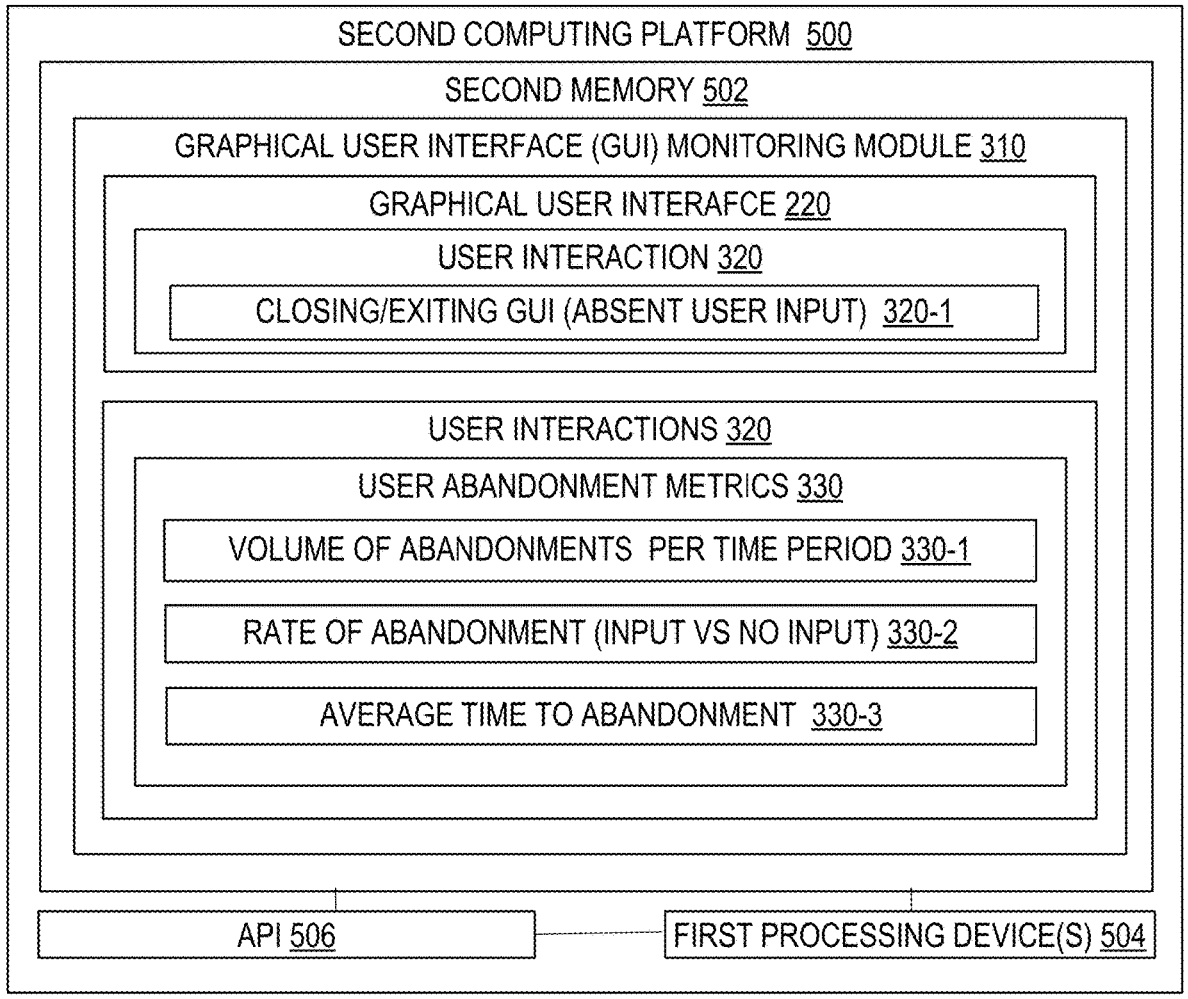
Figure 4:
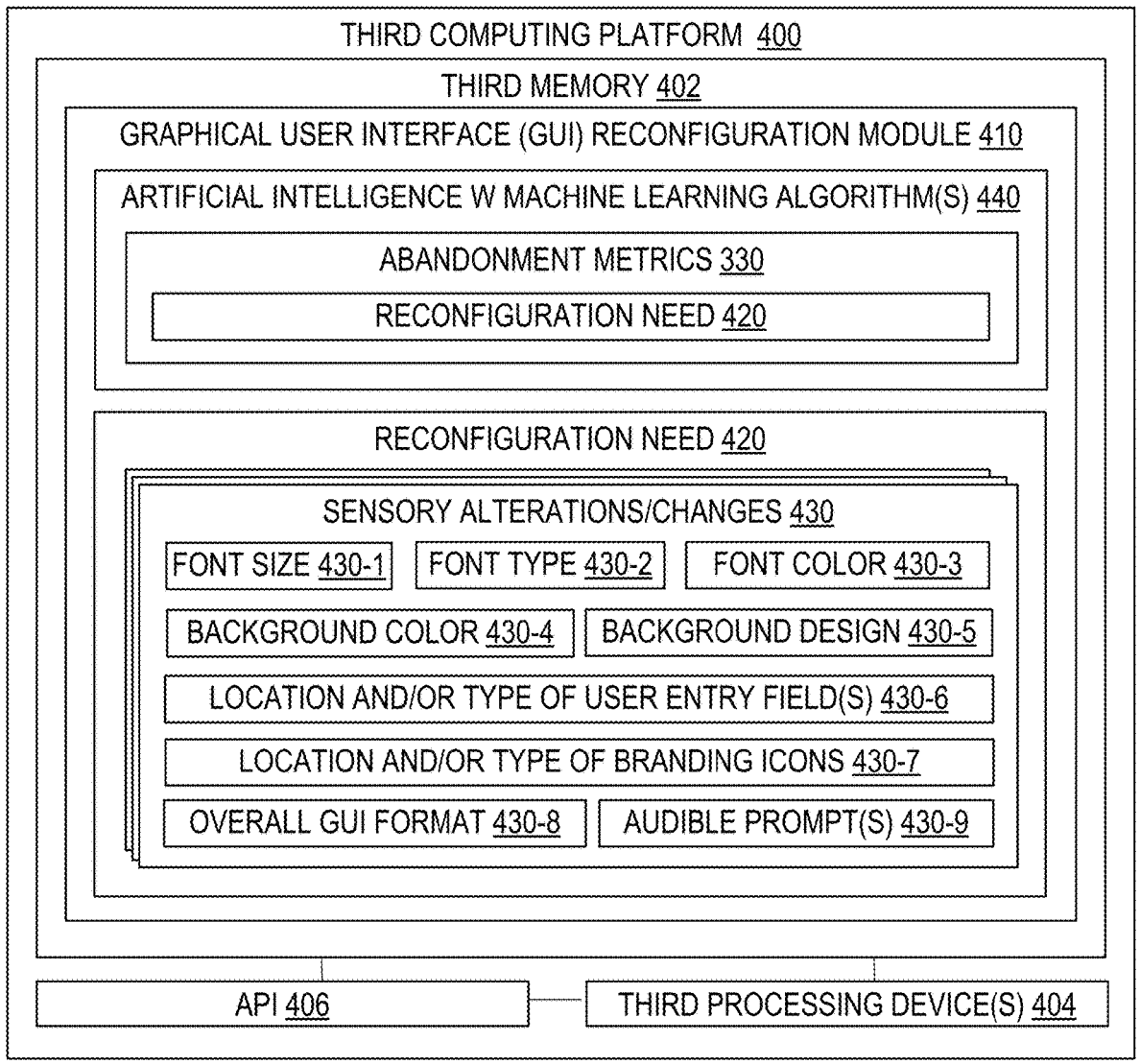
Figure 5A:
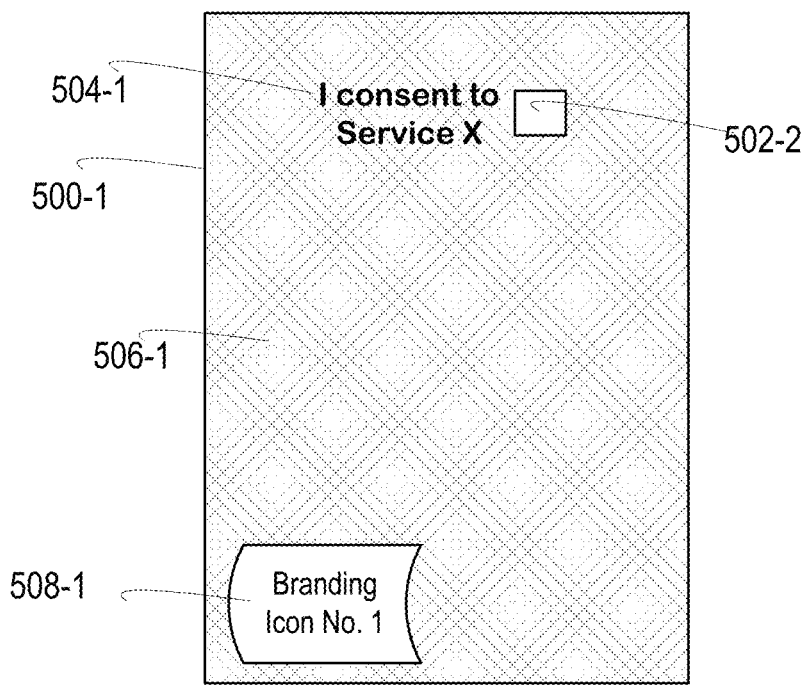
Figure 5B:
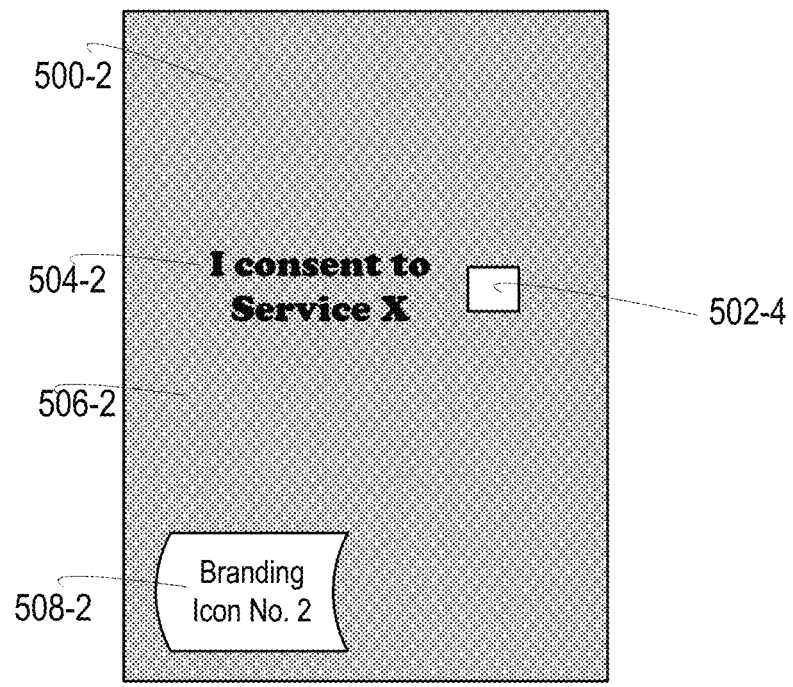
Figure 6:
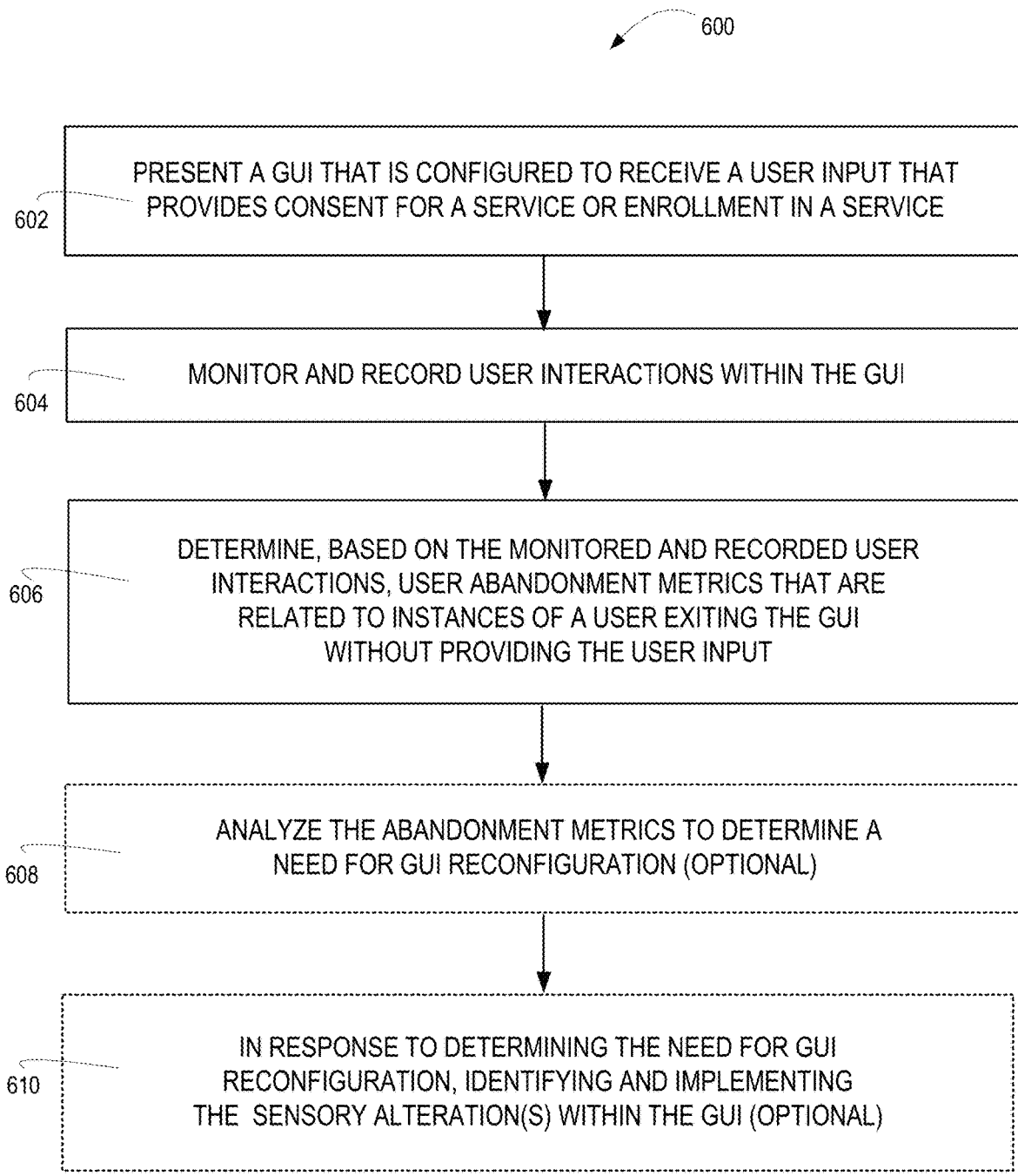

Having thus described embodiments of the disclosure in general terms, reference will now be made to the accompanying drawings, wherein:

FIG. 1 is a schematic/block diagram of a system for tracking user interaction/traffic within a Graphical User Interface (GUI) configured for user consent/authorization and determining abandonment metrics, in accordance with embodiments of the present invention;

FIG. 2 is a schematic/block diagram of a system for tracking user interaction/traffic within a Graphical User Interface (GUI) configured for user consent/authorization, determining abandonment metrics and reconfiguring the GUI based on the abandonment metrics, in accordance with some embodiments of the present disclosure;

FIG. 3 is a block diagram of a computing platform configured for tracking user interaction/traffic within a Graphical User Interface (GUI) configured for user consent/authorization and determining abandonment metrics, in accordance with some embodiments of the present disclosure;

FIG. 4 is a block diagram of a computing platform configured for determining and implementing sensory alterations/changes within a GUI based on abandonment metrics, in accordance with some embodiments of the present disclosure;

FIGS. 5A and 5B depict an exemplary GUI before and after implementing sensory alterations/reconfiguration, in accordance with embodiments of the present invention; and FIG. 6 is a flow diagram of a computer-implemented method for tracking user interaction/traffic within a Graphical User Interface (GUI) configured for user consent/authorization, determining abandonment metrics and reconfiguring the GUI based on the abandonment metrics, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that track and record user interactions/traffic within a Graphical User Interface (GUI) configured for user consent/authorization, specifically user interactions that indicate that the user has abandoned the consent/authorization process (i.e., exited or closed the GUI without providing the user input needed for consent/authorization). As a result of such tracking/recordation, the present invention is able to determine abandonment metrics, such as volume of abandonments over a given time period, rate of abandonment, time to abandonment and the like.

In specific embodiments of the invention, the abandonment metrics are used to determine whether a need exists to reconfigure the GUI and, if a need exists, what sensory alterations to the GUI should occur. The sensory alterations may include, but are not limited to, font type, size and/or color, background type and/or color, overall GUI format, location of user entry fields, type of user entry field, type or location of branding objects, type of visual or audible prompts and the like. The determination of need and the specific sensory alterations may be made specific to users or groups of users or may be generic in nature (i.e., applicable to all users). In specific embodiments of the invention, the identified sensory alterations/changes are applied to a segment of the users, such as those users that have previously abandoned the user consent/authorization process, while in other embodiments of the invention the identified sensory alterations/changes are deployed to all users. Once the sensory alterations to the GUI have been implemented, further tracking/recordation of user interactions are taken and further abandonment metrics are determined to assess whether the sensory alterations should be fully deployed to all users or whether further GUI reconfiguration is needed.

Referring to FIG. 1, shown is a system 100 for tracking user interactions/traffic within a GUI configured for user consent/authorization, in accordance with embodiments of the present invention. System 100 is implemented within a distributed communication network 110, which may include the Internet, one or more intranets, one or more cellular networks or the like. The system includes first computing platform 200 having first memory 202 and one or more first processing devices 204 in communication with first memory 202. First memory 202 stores application 210, which may be a network-hosted application, such as a webpage, mobile application, or the like. Application 210 includes at least one Graphical User Interface (GUI) that is configured to receive a user input 230. User input 230 is configured to provide user consent 240 or user enrollment 250 for a service or like, which is provided by the application-providing entity.

System 100 additionally includes second computing platform 300 having second memory 302 and one or more second processing devices 304 in communication with second memory 302. Second memory 302 stores an GUI monitoring module 310, which is executable by at least one of second processing device(s) 304. GUI monitoring module 310 is configured to track and record user interactions 320 that occur within GUI 220. Specifically, user interactions 320 include those interactions that indicate that the user is abandoning the consent/enrollment process. For example, user interaction 320 may include exiting/closing the GUI without previously providing user input 230 (i.e., without providing consent or enrollment authorization). In response to tracking/recording user interactions 320, GUI monitoring module 310 is configured to determine, based on user interactions 320, abandonment metrics 330. Abandonment metrics 330 may include, but are not limited to, the volume of abandonments over a specified period of time, the rate of abandonment (i.e., consent/enrollment provided vs. no consent/enrollment provided), average time for an abandonment and the like.

Referring to FIG. 2, shown is schematic/block diagram of an alternate system 120 for tracking user interactions/traffic within a GUI configured for user consent/authorization, determining abandonment metrics and using the abandonment metrics to determine whether and how to reconfigure the GUI, in accordance with embodiments of the present invention. Similar to system 100 shown and described in relation to FIG. 1, system 120 includes first computing platform 200 storing application 210 including GUI 220 configured to receive user inputs 230 for service consent 240 and/or service enrollment 250 and second computing platform 300 storing GUI monitoring module 310 configured for tracking/recording user interactions 320 within GUI 220 and determining user abandonment metrics 330 based on the user interactions 320.

System 120 additionally includes third computing platform 400 having third memory 402 and one or more third processing devices 404 in communication with third memory 402. One of ordinary skill in the art will appreciate that the functionality provided by third computing platform 400 may incorporated within second computing platform 300, thus obviating the need for a separate third computing platform 400. Third memory 402 stores an GUI reconfiguration module 310 that is configured to receive and intelligently analyze abandonment metrics 330 to determine whether or not a GUI reconfiguration need 420 is necessary. If a GUI reconfiguration need 420 is necessary, GUI reconfiguration module 310 is further configured to intelligently determine one or more sensory alterations/changes 430 to the GUI and implement the same. Sensory alterations/changes 430 are determined based on the likelihood that they will lessen the probability of a user abandoning the service consent 240 and/or service enrollment 250 process.

Referring to FIG. 3, a block diagram is presented of second computing platform 300 configured for tracking user interactions/traffic within a GUI configured for user consent/authorization, and determining abandonment metrics, in accordance with embodiments of the present invention. In addition to providing greater details of second computing platform 300, FIG. 3 highlights various alternate embodiments of the invention. Second computing platform 300 may comprise one or multiple devices, such as servers or the like. Second computing platform 300 includes second memory 302, which may comprise volatile and/or non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, second computing platform 300 includes one or more second processing devices 304, which may be an application-specific integrated circuit ("ASIC"), or other chipset, logic circuit, or other data processing device. Second processing device(s) 304 may execute one or more application programming interface (APIs) 306 that interface with any resident programs, such as GUI monitoring module 310 or the like, stored in second memory 302 of second computing platform 300 and any external programs. Second processing devices(s) 304 may include various processing subsystems (not shown in FIG. 3) embodied in hardware, firmware, software, and combinations thereof, that enable the functionality of second computing platform 300 and the operability of second computing platform 300 on a network, such as the Intranet, intranet(s), cellular network(s) and the like. For example, processing subsystems allow for initiating and maintaining communications and exchanging data with other networked devices. For the disclosed aspects, processing subsystems of second computing platform 300 may include any subsystem used in conjunction with GUI monitoring module 310 and related tools, routines, sub-routines, algorithms, sub-algorithms, sub-modules thereof.

In specific embodiments of the present invention, second computing platform 300 may additionally include a communications module (not shown in FIG. 3) embodied in hardware, firmware, software, and combinations thereof, that enables electronic communications between second computing platform 300 and other networks and network devices. Thus, communication module may include the requisite hardware, firmware, software and/or combinations thereof for establishing and maintaining a network communication connection with one or more devices and/or networks.

Second memory 302 of second computing platform 300 stores GUI monitoring platform 310. As previously discussed in relation to FIG. 1, GUI monitoring module 310 is configured to track and record user interactions 320 that occur within GUI 220. Specifically, user interactions 320 include those interactions that indicate that the user is abandoning the consent/enrollment process. For example, user interaction 320 may include exiting/closing 320-1 the GUI 220 absent user input 230 (i.e., without providing consent or enrollment authorization).

In response to tracking/recording user interactions 320, GUI monitoring module 310 is configured to determine, based on user interactions 320, abandonment metrics 330. Abandonment metrics 330 may include, but are not limited to, the volume of abandonments 330-1 over a specified period of time, the rate of abandonment 330-2 (i.e., volume of consent/enrollment provided vs. volume of no consent/enrollment provided), average time to abandonment 330-3 (time at which GUI is opened/accessed and time at which GUI is closed/exited) and the like.

Referring to FIG. 4, a block diagram is presented of third computing platform 300 configured for determining a need for GUI reconfiguration and based on the need, determining and implementing sensory alterations/changes for the GUI. In addition to providing greater details of third computing platform 300, FIG. 4 highlights various alternate embodiments of the invention. Third computing platform 400 may comprise one or multiple devices, such as servers or the like. Third computing platform 400 includes third memory 402, which may comprise volatile and/or non-volatile memory, such as read-only and/or random-access memory (RAM and ROM), EPROM, EEPROM, flash cards, or any memory common to computing platforms). Moreover, third memory 402 may comprise cloud storage, such as provided by a cloud storage service and/or a cloud connection service.

Further, third computing platform 400 includes one or more third processing devices 404, which may be an application-specific integrated circuit ("ASIC"), or other chipset, logic circuit, or other data processing device. Third processing device(s) 404 may execute one or more application programming interface (APIs) 406 that interface with any resident programs, such as GUI reconfiguration module 410 or the like, stored in third memory 402 of third computing platform 400 and any external programs. Third processing devices(s) 404 may include various processing subsystems (not shown in FIG. 4) embodied in hardware, firmware, software, and combinations thereof, that enable the functionality of third computing platform 400 and the operability of third computing platform 400 on a network, such as the Intranet, intranet(s), cellular network(s) and the like. For example, processing subsystems allow for initiating and maintaining communications and exchanging data with other networked devices. For the disclosed aspects, processing subsystems of third computing platform 400 may include any subsystem used in conjunction with GUI reconfiguration module 410 and related tools, routines, sub-routines, algorithms, sub-algorithms, sub-modules thereof.

In specific embodiments of the present invention, third computing platform 400 may additionally include a communications module (not shown in FIG. 4) embodied in hardware, firmware, software, and combinations thereof, that enables electronic communications between third computing platform 400 and other networks and network devices. Thus, communication module may include the requisite hardware, firmware, software and/or combinations thereof for establishing and maintaining a network communication connection with one or more devices and/or networks.

Third memory 402 of third computing platform 400 stores GUI reconfiguration platform 410. As previously discussed in relation to FIG. 2, GUI reconfiguration module 410 is configured to receive and intelligently analyze abandonment metrics 330 to determine whether or not a GUI reconfiguration need 420 is necessary. Intelligent analysis may be performed using Artificial Intelligence (AI) 440 including Machine Learning (ML) techniques or the like. If a GUI reconfiguration need 420 is necessary, GUI reconfiguration module 310 is further configured to intelligently determine (using AI including ML techniques or the like) one or more sensory alterations/changes 430 to the GUI and implement the same. Sensory alterations/changes 430 are determined based on the likelihood that they will lessen the probability of a user abandoning the service consent 240 and/or service enrollment 250 process. Sensory alterations/changes 430 may include but are not limited to font size 430-1, font type 430-2, font color 430-3, background color 430-4, background type/design 430-5, location and/or type of user entry fields 430-6, location and/or type of branding icons/objects 430-7, overall GUI format 430-9, visual and/or audible prompts 430-10 and the like.

In specific embodiments of the invention, the reconfiguration of the GUI may be performed on a specific user basis, such that the sensory alterations/changes 430 are user-specific (e.g., user that abandoned the consent/enrollment process). For example, the background of the GUI may be changed from a generic image to a user-specific image that is aligned with a known user preference, such as a preferred sports team image or the like.

In other embodiments of the invention, the initial reconfiguration of the GUI may be limited to only those users that previously abandoned the GUI absent completion of the consent/enrollment process. In such embodiments of the invention further tracking of user GUI interactions, and determination of further abandonment metrics are undertaken prior to a decision, based on the further abandonment metrics, on whether or not to fully deploy the reconfiguration (i.e., implement the sensory alterations/changes) across all users. In this regard the initial deployment of the GUI reconfiguration to the select group of users serves as test for whether or not the GUI reconfiguration has been successful in increasing user consent/enrollment and, thus, warrants full deployment to all users.

In other embodiments of the invention, implementation/deployment of the sensory alterations/changes 430 merits further tracking of user interactions and determinations of further abandonment metrics, so that determinations can be made as to whether further refinements to the GUI are necessary to improve user consent/enrollment. Such a process may be ongoing throughout the life of the GUI to ensure that the highest level of consent/enrollment is reached.

Referring to FIGS. 5A and 5B, exemplary Graphical User Interfaces 500 (GUIs, otherwise referred to as User Interfaces (UIs) are depicted, in accordance with embodiments of embodiments of the present invention. FIG. 5A depicts an initial GUI 500-1 in which user interactions are monitored and tracked, and subsequently abandonment metrics are determined. GUI 500 has an initial user input entry field location 502-1, an initial font size/type 504-1, an initial background pattern 506-1 and an initial branding icon/object (branding icon No. 1) 508-1. FIG. 5B depicts a subsequent GUI 500-2 after a determination has been made to reconfigure the GUI 500 and the sensory alternations have been identified and implemented. As shown, the sensory alterations/changes include altering location of the user input entry filed 502-2, font size and type 504-2, altering/changing background type/pattern 506-2 and altering/changing branding icon/object (branding icon No. 2) 508-2.

Referring to FIG. 6, a flow diagram is depicted of a method 600 for tracking user interactions/traffic within a GUI configured for user consent/authorization, determining abandonment metrics and using the abandonment metrics to determine whether and how to reconfigure the GUI, in accordance with embodiments of the present invention. At Event 610, a GUI is presented that is configured to receive a user input that provides consent, authorization or enrollment for a service. For example, the user input may provide consent/authorization for using or tracking data associated with the user or enrollment in a assessment-based service or the like. The type of user input is dictated by the configuration of the GUI and requirements of the service. For example, the user input may be activating (i.e., clicking on) a check box or providing pre-registered user credentials, such as, username and passcode/word or the like.

At Event 604, user interactions within the GUI are monitored and recorded, including user interactions that indicate that the user has abandoned the consent or enrollment process. For example, the user interaction may be closing or exiting the GUI without providing the requisite user input for connect or enrollment during the GUI session. At Event 606, user abandonment metrics are determined based on the monitored and recorded user interactions. The abandonment metrics are related to instances in which a user exits/closes the GUI without providing the user input required for consent/enrollment. For example, abandonment metrics may include, but are not limited to, volume of abandonments over a predetermined time period (e.g., a day, a week, a month or the like), rate of abandonment (i.e., volume of abandonment versus overall volume of GUI accesses), time to abandonment (i.e., time from when a user accesses/enters the GUI to when the user exits/closes the GUI), time of day/week/month at which abandonments are occurring and the like.

At optional Event 608, Artificial Intelligence (AI) including Machine Learning (ML) techniques are implemented to analyze the abandonment metrics to determine a need for GUI reconfiguration (i.e., does the volume of abandonments or rate of abandonment exceed a predetermined threshold or does rate of increase over time of the volume of abandonments or rate of abandonments exceed a predetermined threshold).

In response to determining that the need for a GUI reconfiguration exists, at optional Event 610, one or more sensory alterations/changes to the GUI are identified and implemented within the GUI. The sensory alterations may include, but are not limited to, altering font size, font type, font color, background color, background type/design, location and/or type of user entry fields, location and/or type of branding icons/objects, overall GUI format, visual and/or audible prompts and the like. In specific embodiments of the method, the sensory alterations may be identified and implemented on a per-user basis (i.e., specific to a user). In other embodiments of the invention, the sensory alterations may be implemented across a sample population of user GUIs (i.e., less than all of the users' GUIs). For example, the sensory alterations may be implemented in GUIs accessed by users that previously abandonment the consent/enrollment process to monitor and track the effectiveness of the sensory alterations in increasing consent/enrollments. In such embodiments of the invention, if the sensory alterations prove to be effective across the sample population of users. The sensory alterations may be deployed across all of the user GUIs.

Thus, present embodiments of the invention provide devices, methods, computer program products and/or the like tracking and recording user interactions within a Graphical User Interface (GUI) configured for user consent/authorization, specifically user interactions that indicate that the user has abandoned the consent/authorization process (i.e., exited or closed the GUI without providing the user input needed for consent/authorization). As a result of such tracking/recordation, the present invention is able to determine abandonment metrics, such as volume of abandonments over a given time period, rate of abandonment, time to abandonment and the like. In specific embodiments of the invention, the abandonment metrics are used to intelligently determine, in some instances on a per-user basis, whether a need exists to reconfigure the GUI and, if a need exists, what sensory alterations to the GUI should be implemented.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining Graphical User Interface (GUI)-related user behavior in a network environment, the system comprising:
    a first computing platform having a first memory and one or more first computing processor devices in communication with the first memory, wherein the first memory stores a network-hosted application that is executable by at least one of the one or more first computing processing devices and configured to present a GUI that is configured to receive a user input that provides consent for a service or enrollment in a service;
    a second computing platform having a second memory and one or more second computing processor devices in communication with the second memory, wherein the second memory stores a GUI monitoring module that is executable by at least one of the one or more second computing processing devices and configured to:
    monitor and record user interactions within the GUI, and
    determine, based on the monitored and recorded user interactions, user abandonment metrics that are related to instances of a user exiting the GUI without providing the user input; and
    a third computing platform having a third memory and one or more third computing processor devices in communication with the third memory, wherein the third memory stores a GUI reconfiguration module that is executable by at least one of the one or more third computing processing devices and configured to:
    receive and analyze the abandonment metrics to determine a need for GUI reconfiguration, and
    in response to determining the need for GUI reconfiguration, identify and implement at least one sensory alteration within the GUI, wherein implementing the at least one sensory alteration within the GUI comprises revising a version of the application and providing the revised version application to only those users that previously exited the GUI without providing the user input.

2. The system of claim 1, wherein the GUI monitoring module is further configured to:
    in response to implementing the at least one sensory alteration, monitor and record further user interactions within the GUI, and
    determine, based on the monitored and recorded further user interactions, further user abandonment metrics that are related to instances of a user exiting the GUI without providing the user input,
    wherein the GUI reconfiguration module is further configured to:
    receive and analyze the further abandonment metrics and compare the abandonment metrices to the further abandonment metrices to determine a need for at least one further GUI reconfiguration, and
    in response to determining the need for further GUI reconfiguration, identify and implement the at least one further sensory alteration within the GUI.

3. The system of claim 1, wherein the GUI monitoring module is further configured to:
    in response to implementing the at least one sensory alteration, monitor and record further user interactions within the GUI of the revised application, and
    determine, based on the monitored and recorded further user interactions, further user abandonment metrics that are related to instances of a user exiting the GUI of the revised application without providing the user input,
    wherein the GUI reconfiguration module is further configured to:
    receive and analyze the further abandonment metrics and compare the abandonment metrices to the further abandonment metrices to determine a need for full user deployment of the at least one sensory alteration, and in response to determining the need for full user deployment of the at least one further sensory alteration, provide the revised version of the application to all users.

4. The system of claim 1, wherein GUI reconfiguration module is configured to identify and implement the at least one sensory alteration within the GUI, wherein the at least one sensory alteration within the GUI includes one or more of altering (i) a font type or size, (ii) background color or pattern, (iii) a format of the GUI, (iv) a location of a user entry field, (v) one or more branding objects presented in the GUI, and (vi) audible prompts provided by the GUI.

5. The system of claim 1, wherein the GUI monitoring module is configured to monitor and record the user interactions within the GUI, wherein the user interactions include closing the GUI absent receipt of the user input.

6. The system of claim 1, wherein the GUI monitoring module is further configured to determine, based on the monitored and recorded user interactions, user abandonment metrics, wherein the abandonment metrics include at least one of (i) volume of abandonments, (ii) rate of abandonment, and (iii) average time to abandonment.

7. A computer-implemented method for determining Graphical User Interface (GUI)-related user behavior, the computer-implemented method is executed by one or more computing processor devices and comprises:
presenting a GUI that is configured to receive a user input that provides consent for a service or enrollment in a service;
monitoring and recording user interactions within the GUI;
determining, based on the monitored and recorded user interactions, user abandonment metrics that are related to instances of a user exiting the GUI without providing the user input;
receiving and analyzing the abandonment metrics to determine a need for GUI reconfiguration, and
in response to determining the need for GUI reconfiguration, identifying and implementing the at least one sensory alteration within the GUI, wherein implementing the at least one sensory alteration within the GUI further comprising revising a version of the application to include the at least one sensory alteration and providing the revised version of the application to only those users which previously exiting the GUI without providing the user input.

8. The computer-implemented method system of claim 7, further comprising:
in response to implementing the at least one sensory alteration, monitoring and recording further user interactions within the GUI;
determining, based on the monitored and recorded further user interactions, further user abandonment metrics that are related to instances of a user exiting the GUI without providing the user input;
receiving and analyzing the further abandonment metrics and comparing the abandonment metrics to the further abandonment metrices to determine a need for further GUI reconfiguration, and
in response to determining the need for further GUI reconfiguration, identifying and implementing the at least one further sensory alteration within the GUI.

9. The computer-implemented method of claim 7, further comprising:
in response to implementing the at least one sensory alteration, monitoring and recording further user interactions within the GUI of the revised application;
determining, based on the monitored and recorded further user interactions, further user abandonment metrics that are related to instances of a user exiting the GUI of the revised application without providing the user input;
receiving and analyzing the further abandonment metrics and comparing the abandonment metrics to the further abandonment metrices to determine a need for full user deployment of the at least one sensory alteration; and
in response to determining the need for full user deployment of the at least one further sensory alteration, providing the revised version of the application to all users.

10. The computer-implemented method of claim 7, wherein identifying and implementing the at least one sensory alteration within the GUI further comprises identifying and implementing the at least one sensory alteration within the GUI, wherein the at least one sensory alteration within the GUI includes one or more of altering (i) a font type or size, (ii) background color or pattern, (iii) a format of the GUI, (iv) a location of a user entry field, (v) one or more branding objects presented in the GUI, and (vi) audible prompts provided by the GUI.

11. A computer program product comprising:
a non-transitory computer-readable medium comprising:
a first set of codes for causing a computer to present a GUI that is configured to receive a user input that provides consent for a service or enrollment in a service;
a second det of codes for causing a computer to monitor and record user interactions within the GUI;
a third set of codes for causing a computer to determine, based on the monitored and recorded user interactions, user abandonment metrics that are related to instances of a user exiting the GUI without providing the user input;
a fourth set of codes for causing a computer to receive and analyze the abandonment metrics to determine a need for GUI reconfiguration; and
a fifth set of codes for causing a computer to, in response to determining the need for GUI reconfiguration, identifying and implementing the at least one sensory alteration within the GUI, wherein implementing the at least one sensory alteration within the GUI comprises revising a version of the application to include the at least one sensory alteration and providing the revised version of the application to only those users which previously exiting the GUI without providing the user input.

12. The computer program product of claim 11, wherein,
the second set of codes are further configured to cause the computer to, in response to implementing the at least one sensory alteration, monitor and record further user interactions within the GUI,
the third set of codes are further configured to cause the computer to determine, based on the monitored and recorded further user interactions, further user abandonment metrics that are related to instances of a user exiting the GUI without providing the user input,
the fourth set of codes are further configured to cause the computer to receive and analyze the further abandonment metrics and compare the abandonment metrics to the further abandonment metrices to determine a need for further GUI reconfiguration, and
the fifth set of codes are further configured to cause the computer to, in response to determining the need for further GUI reconfiguration, identify and implement the at least one further sensory alteration within the GUI.

13. The computer program product of claim 11, wherein, the second set of codes are further configured to cause the computer to, in response to implementing the at least one sensory alteration, monitor and record further user interactions within the GUI of the revised application, the third set of codes are further configured to cause the computer to determine, based on the monitored and recorded further user interactions, further user abandonment metrics that are related to instances of a user exiting the GUI of the revised application without providing the user input, the fourth set of codes are further configured to cause the computer to receive and analyze the further abandonment metrics and compare the abandonment metrics to the further abandonment metrics to determine a need for full user deployment of the at least one sensory alteration, and the fifth set of codes are further configured to cause the computer to, in response to determining the need for full user deployment of the at least one further sensory alteration, provide the revised version of the application to all users.

14. The computer program product of claim 11, wherein the fifth set of codes are further configured to cause the computer to identify and implement the at least one sensory alteration within the GUI, wherein the at least one sensory alteration within the GUI includes one or more of altering (i) a font type or size, (ii) background color or pattern, (iii) a format of the GUI, (iv) a location of a user entry field, (v) one or more branding objects presented in the GUI, and (vi) audible prompts provided by the GUI.

* * * * *